(12) United States Patent
Weng et al.

(10) Patent No.: US 6,836,406 B2
(45) Date of Patent: Dec. 28, 2004

(54) AUTOMATED DISK-EJECTION APPARATUS AND DISK ARRAY HAVING THE SAME

(75) Inventors: Mao-Huai Weng, Taipei Hsien (TW); Chia-Chang Wu, Taipei Hsien (TW); Po-Yao Chen, Taipei Hsien (TW); Deryi Wu, Taipei Hsien (TW); Ping-Hua Lien, Taipei Hsien (TW)

(73) Assignee: Acard Technology Corporation, Taipei Hsien (TW)

( * ) Notice: Subject to any disclaimer, the term of this patent is extended or adjusted under 35 U.S.C. 154(b) by 627 days.

(21) Appl. No.: 09/906,367

(22) Filed: Jul. 16, 2001

(65) Prior Publication Data

US 2002/0089821 A1 Jul. 11, 2002

(30) Foreign Application Priority Data

Nov. 10, 2000 (TW) .................................. 89219540 U (51) Int. Cl.[7] .............................. H05K 7/10; H05K 5/02
(52) U.S. Cl. ..................... 361/685; 361/728; 361/729; 361/731
(58) Field of Search ................................ 361/679, 685, 361/727–733, 747; 360/99.02, 99.03, 99.06, 99.07

(56) References Cited

U.S. PATENT DOCUMENTS

| | | | | | |
|---|---|---|---|---|---|
| 4,614,389 A | * | 9/1986 | Albert et al. | ................ | 439/144 |
| 4,778,394 A | * | 10/1988 | Smith | ........................... | 439/59 |
| 5,237,473 A | * | 8/1993 | Yoshida | .................... | 360/99.06 |
| 5,305,180 A | * | 4/1994 | Mitchell et al. | ............ | 361/685 |
| 5,483,419 A | * | 1/1996 | Kaczeus et al. | ............ | 361/685 |
| 5,669,512 A | * | 9/1997 | Joslin | ....................... | 211/41.17 |
| 5,671,198 A | * | 9/1997 | Tsuchiya et al. | ......... | 369/30.32 |
| 5,737,185 A | * | 4/1998 | Morrison et al. | ........... | 361/685 |
| 5,740,012 A | * | 4/1998 | Choi | .......................... | 361/686 |
| 5,790,373 A | * | 8/1998 | Kim et al. | .................. | 361/685 |
| 5,793,614 A | * | 8/1998 | Tollbom | ..................... | 361/732 |
| 5,828,546 A | * | 10/1998 | Tirrell et al. | ................ | 361/685 |
| 5,886,869 A | * | 3/1999 | Fussell et al. | .............. | 361/685 |
| 6,147,878 A | * | 11/2000 | Heselton | ..................... | 361/798 |
| 6,560,098 B1 | * | 5/2003 | Beinor, Jr. et al. | ......... | 361/685 |
| 6,603,657 B2 | * | 8/2003 | Tanzer et al. | ............... | 361/685 |
| 2003/0007277 A1 | * | 1/2003 | Emberty et al. | ............. | 360/69 |
| 2003/0009700 A1 | * | 1/2003 | Emberty et al. | ............. | 713/300 |
| 2003/0030991 A1 | * | 2/2003 | Riddiford et al. | ........... | 361/724 |
| 2003/0030993 A1 | * | 2/2003 | Kitchen et al. | ............. | 361/726 |
| 2004/0024965 A1 | * | 2/2004 | Suzuki et al. | ............... | 711/115 |
| 2004/0145869 A1 | * | 7/2004 | Tanaka et al. | .............. | 361/695 |

FOREIGN PATENT DOCUMENTS

| | | | | | |
|---|---|---|---|---|---|
| EP | 332793 A | * | 9/1989 | ........... | B23P/19/00 |
| JP | 61051682 A | * | 3/1986 | ........... | G11B/25/04 |

* cited by examiner

*Primary Examiner*—Anatoly Vortman
(74) *Attorney, Agent, or Firm*—Ladas & Parry (57) ABSTRACT

Disclosed is an automated disk-ejection apparatus for use in a disk system. The disk system includes a disk box for housing a disk drive, and the auto-ejection apparatus comprises: a handle for pulling out or pushing back the disk box; a pushing mechanism for pushing the handle; and a control circuit for controlling the pushing mechanism. The featured disk apparatus is designed such that while the disk box needs to be pulled out in order for loading or replacing the disk drive, the pushing mechanism is activated to push the handle. The handle can thus be rotated along the pivot into an inoperative state, for subsequently to be pulled for withdrawing the disk box. Moreover, another embodiment of the present invention relates to using a pushing mechanism to push a rotatable panel of a disk box.

19 Claims, 6 Drawing Sheets

AUTOMATED DISK-EJECTION APPARATUS AND DISK ARRAY HAVING THE SAME

BACKGROUND OF THE PRESENT INVENTION

The present invention relates to an automated disk-ejection apparatus, for use in an information storage device such as a disk drive, and particularly, to a hard disk box. The automated disk-ejection apparatus provides a handle or panel, which can be auto-ejected such that a user can easily withdraw the disk box for loading or replacing the disk drive. Moreover, the automated disk-ejection may also comprise a status indicator to clearly indicate the operation status, in accordance with auto-ejection of the handle. The status indicator can remind the user to plug or unplug the disk box correctly, so as to avoid that the host computer coupled to the disk box becomes down due to fault actions. The functions of auto-ejection and auto-indication are particularly important in the applications of disk arrays. As a result, the present invention provides a quite useful and intelligent automated disk-ejection apparatus.

In this information era, a great deal of information is digitalized and processed by computers. Thus, there is a need for a recording medium of a large capacity, high processing speed and great stability, to store the digital information. The need is especially important for businesses dealing with the processing of numerous customers' transaction data. For example, the banking, security, telecommunication, franchise or international enterprises are all required to store, access or backup information in a very efficient way. Based on the factors of speed, cost, stability and convenience of extension, there have been the design and development of the Redundant Arrays of Inexpensive Disks (RAID).

The idea of RAID is to integrate a plurality of small and inexpensive disk drives into a whole disk array, and the performance of such a disk array must surpass a single, large disk drive that costs a lot more. The RAID has many features. For example, although disk arrays are formed by integrating a plurality of disk drives, form the viewpoint of a host computer system, disk arrays are just like a single memory storage unit. The disk arrays can easily backup data in a redundancy way of storage, and perform the fault-tolerant function. Moreover, while some disk drive units fail, the design of using a plurality of disk drive units enables the whole disk array system to be easily repaired by only replacing a failed disk drive. In contrast, the whole single, large disk drive needs to be checked and repaired once any defects happen.

Figure 1:
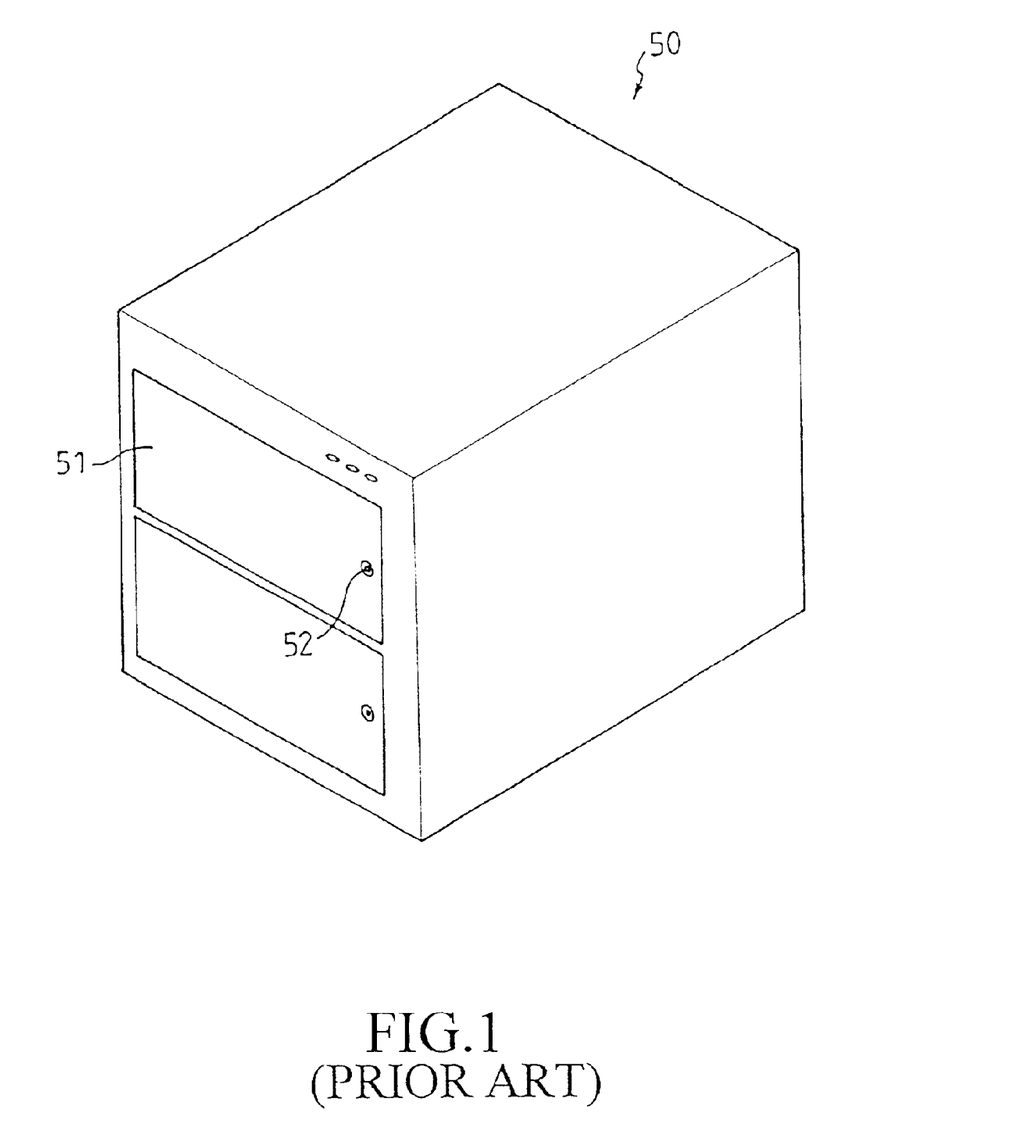
FIG. 1 illustrates a prior art disk array system.

For easy repair and replacement, a disk array system usually uses disk boxes to achieve a modular design. A disk box can accommodate a disk drive, and the disk drive is electrically connected to the disk array system through the disk box. In addition to convenience of loading and unloading, the advantages of the disk box include satisfactory protection of a sophisticated disk drive, especially a hard disk drive. However, a conventional design of a disk array system using a disk box, if the design supports hot plug (hot plug means that, while a disk unit is being loaded or repaired, the host computer using the disk array system can keep operating without being turned off), will add a lock to each of the disk boxes. The locks are used to avoid improper unplug of disk boxes, so as to prevent a working disk drive from being improperly disconnected. The host system is thus free from becoming down due to careless actions. Referring to FIG. 1, a conventional disk array system 50 comprises two disk boxes 51 for accommodating disk drives (not shown). As mentioned before, a huge disk array system may comprise as many as hundreds of disk boxes. The disk box 51 comprises a lock 52 for locking the box. Generally, the lock 52 can be implemented by a lock sliver, and a lock slit is also formed on the disk box 51 (not shown). The lock sliver can be snapped into the lock slit to lock each disk box.

While a disk box needs to be unplugged for loading or replacing a disk drive, an operator must get the key and insert the key to the lock to unlock the disk box. After loading or replacing the disk drive, the operator must push back the disk box and lock the disk drive. The inconvenience and problems encountered have been described above.

However, as the number of disk units increases in a great scale, the above design using locks will encounter many problems. For example, in a disk array system used by a phone company, there are as many as hundreds of disk units. In order to unload and replace a failed disk drive, it is quite possible to unplug the good disk drive because of difficulty in locating a target disk drive from the disk arrays. The result of a host system crash could be so critical that the service of the company is stopped and important information is lost. Certainly, considering the serious result of a system breakdown, the convenience of hot plug can be sacrificed without adopting the design of disk boxes and locks. However, such a design is so inconvenient and restricted that the design is almost unacceptable. Thus, how to overcome the above disadvantages of a disk array system is an object of the present invention.

SUMMARY OF THE PRESENT INVENTION

An object of the present invention is to provide an automated disk-ejection apparatus for use in a disk system. In accordance with an embodiment of the present invention, the disk system includes a disk box for housing a disk drive. The apparatus comprises: a handle for pulling out or pushing back the disk box; a pushing mechanism for pushing the handle; and a control circuit for controlling the mechanism. The apparatus is designed such that while the disk box needs to be pulled out for loading or replacing the disk drive, the mechanism is activated to push the handle. The handle can be rotated along a pivot into an inoperative state and subsequently be pulled for withdrawing the disk box. The featured disk system has the advantage of easy loading or unloading.

In addition, in accordance with another embodiment of the present invention, the above object can also be achieved by using the mechanism to push a rotatable panel of the disk box.

Another object of the present invention is to provide a disk array system having an auto-ejection handle. In accordance with an embodiment of the present invention, the disk array system comprises: a plurality of disk boxes for accommodating disk drives, each disk box including a handle for pulling or pushing the disk box; a plurality of pushing mechanisms for pushing the handles of the disk boxes; and a control circuit for controlling the pushing mechanisms, such that while at least one of the disk boxes needs to be pulled out in order for loading or replacing the disk drives, the corresponding pushing mechanism is activated. Because the pushing mechanism automatically pushes out the handle of the disk box to be unplugged, it will remind an operator to pull the handle and unplug the disk box. The disk array system has the advantage of easy operation. Because the handles of good disk drives will not be in an inoperative state (that is, the handles of good disk drives are not pushed out), it is avoided that an operator inadvertently unplugs a good disk drive.

Still another object of the present invention is to provide a disk array system having an auto-ejection handle. In accordance with another embodiment of the present invention, the disk array system further comprises a plurality of status indicators located at side panels of each disk box for indicating operation status of corresponding disk boxes. Therefore, as a disk array system includes numerous disk drive units, together with the above-mentioned auto-ejection handle, it is much easier to identify a failed disk drive by the indication of status indicators. Inadvertent unplugging a good disk drive can thus be avoided.

Further another object of the present invention is to provide a convenient and safe automated disk-ejection. In accordance with the present invention, common end users without skill of engineering are also able to load or replace disk drives.

BRIEF DESCRIPTION OF THE DRAWINGS

The present invention now will become better understood with reference to the accompanying drawings in which.

| LIST OF REFERENCE NUMERALS | |
|---|---|
| 1, 2 | disk box |
| 11 | disk box handle |
| 12 | disk array system panel |
| 13 | status indicator |
| 14 | status label |
| 15 | lock |
| 16 | ejection mechanism |
| 17 | disk box panel |
| 18 | side groove |
| 19 | pivot |
| 20 | disk array system |
| 21 | hook |
| 22 | panel protrusion portion |
| 23 | heat dissipation slit |
| 24 | handle protrusion |
| 30 | disk array system |
| 31, 32 | disk box |
| 33 | pushing mechanism |
| 34 | disk array panel |
| 35 | pivot |

| -continued | |
|---|---|
| LIST OF REFERENCE NUMERALS | |
| 40 | disk array system |
| 41, 42 | disk box |
| 43 | pushing mechanism |
| 44 | disk box panel |
| 45 | pivot |
| 46 | handle |
| 50 | disk array housing |
| 51 | disk box |
| 52 | lock |

DETAILED DESCRIPTION OF THE PRESENT INVENTION

Figure 2:
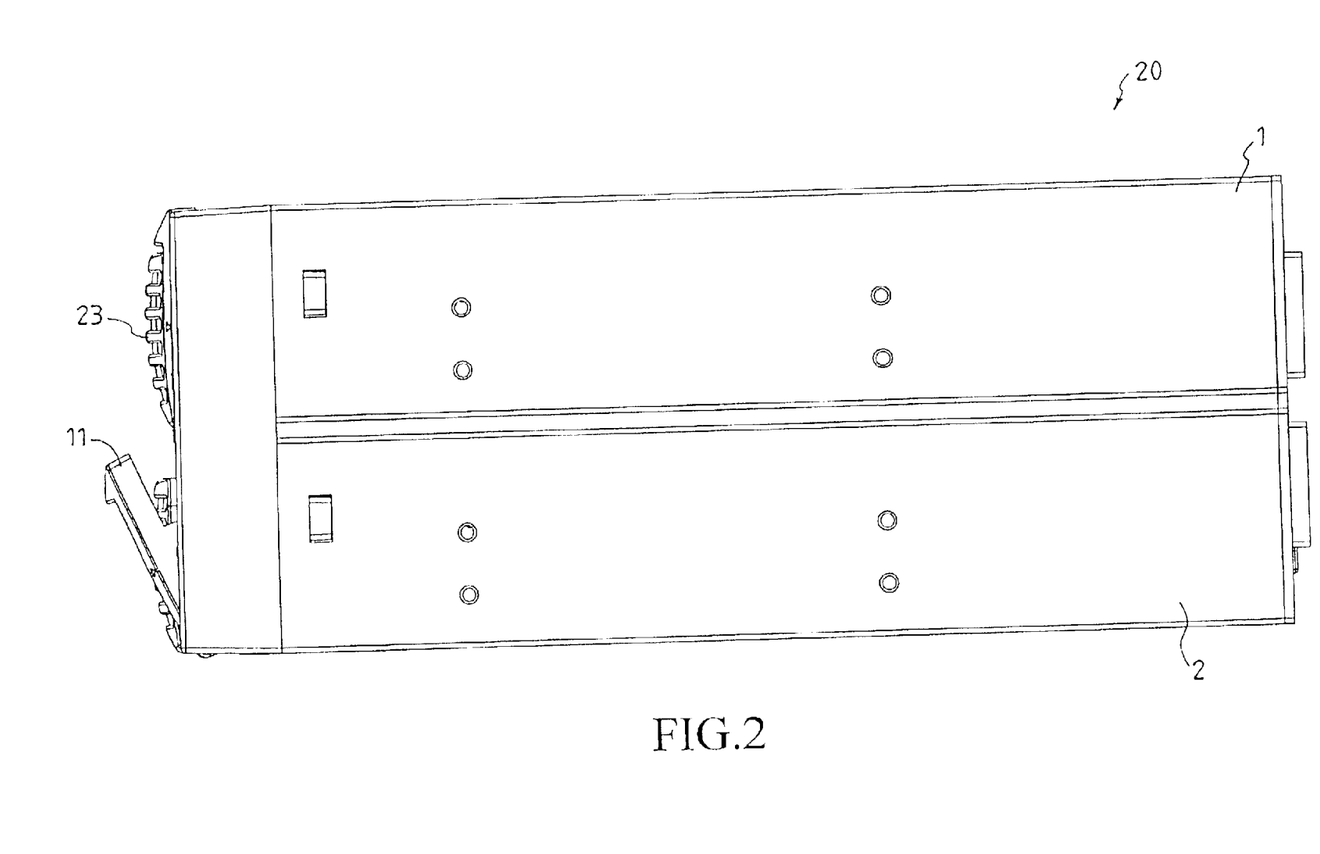
FIG. 2 is a side-view of two disk boxes in accordance with an embodiment of the present invention, wherein a handle of the bottom disk box is in an inoperative state.
Figure 3:
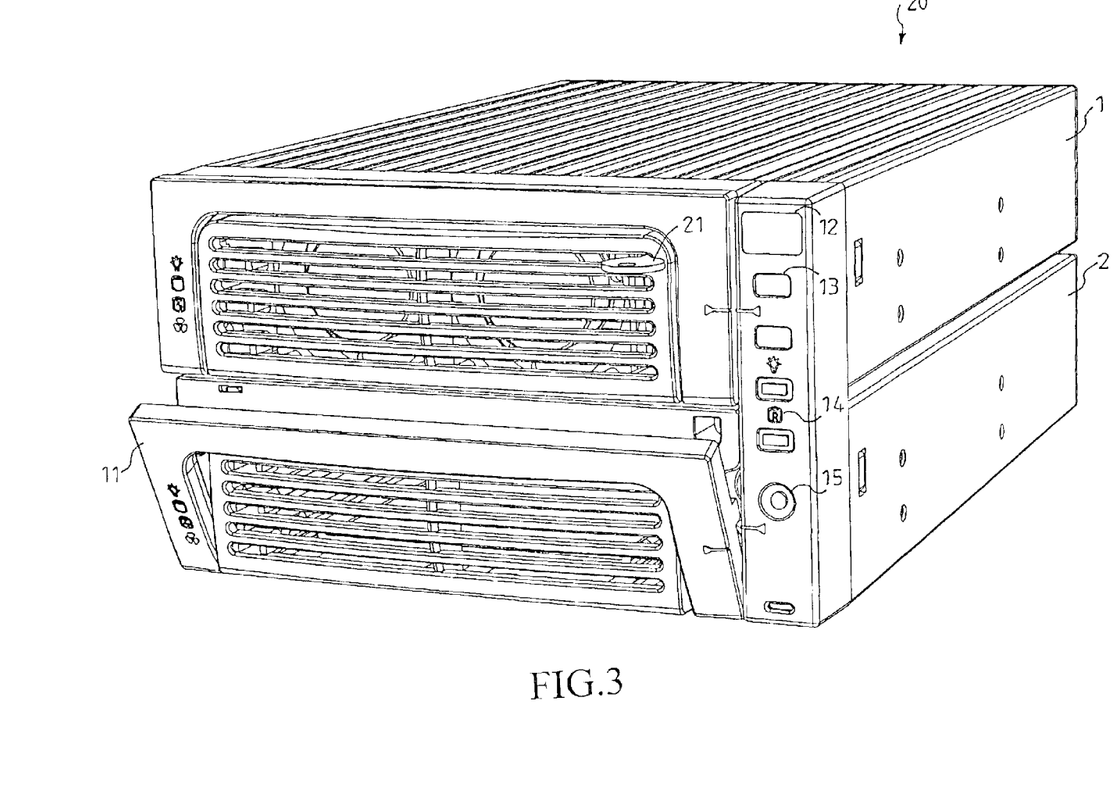
FIG. 3 is a perspective view of two disk boxes in accordance with an embodiment of the present invention, wherein a handle of the bottom disk box is in an inoperative state.

FIG. 2 is a side view of a disk array system 20 having an auto-ejection apparatus in accordance with an embodiment of the present invention. The disk array system 20 comprises two disk boxes 1 and 2 for accommodating disk drives (not shown). A handle 11 of the disk box 2 is in an inoperative state, and a handle of the disk box 1 is in an operative state. FIG. 3 is a perspective view of the system illustrated in FIG. 2. In each disk box of the disk array system 20 of the present invention, a pushing mechanism (not shown in FIGS. 2 and 3) is used to push the handle 11 of the disk box 2, while the disk drive in the disk box 2 needs to be repaired or replaced. The handle can thus rotate to an inoperative state, for subsequent pulling the handle 11 outward to withdraw the disk box 2.

Figure 4:
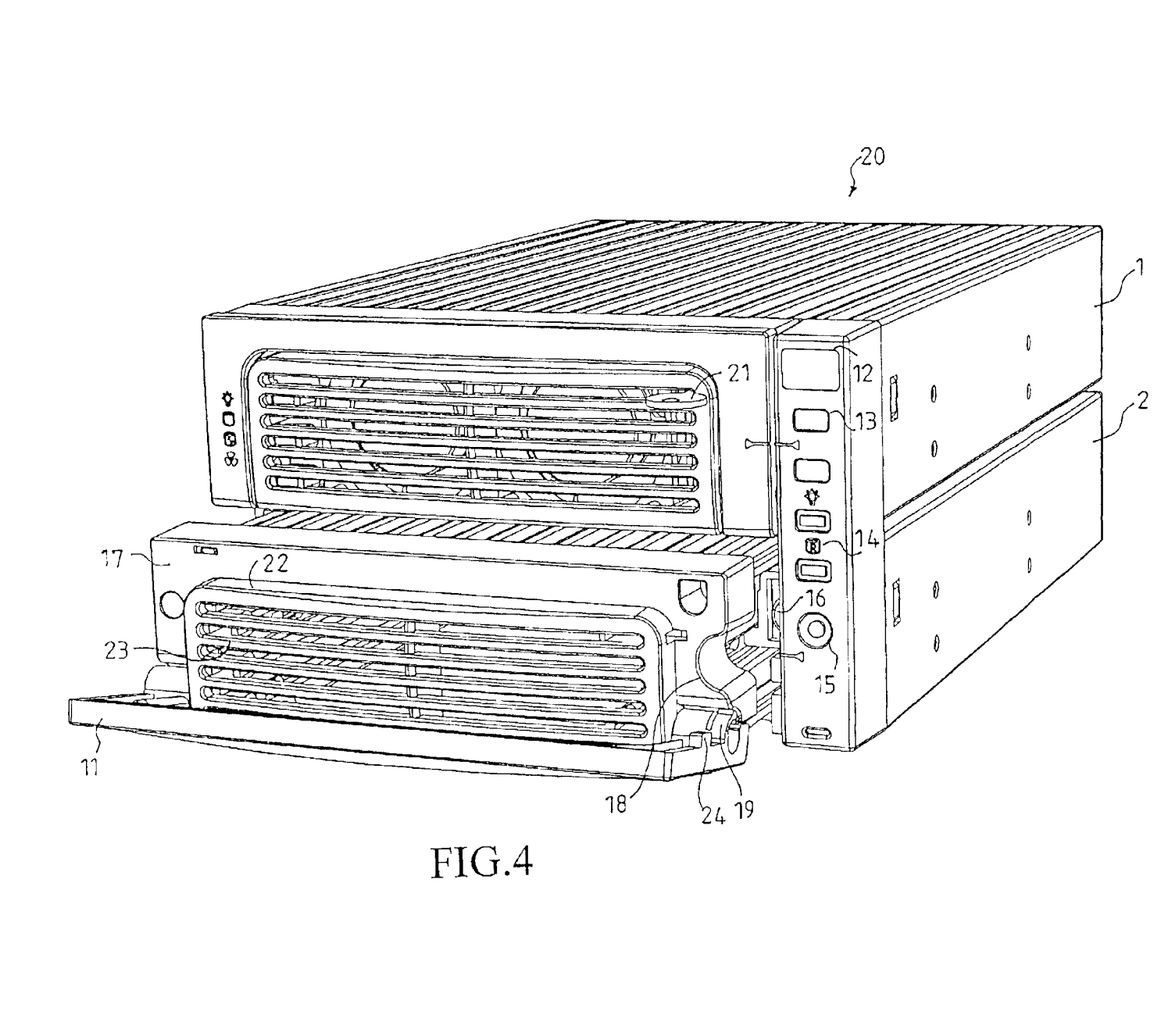
FIG. 4 is a perspective view of two disk boxes in accordance with an embodiment of the present invention, wherein the bottom disk box has been pulled out to an extent.

FIG. 4 shows the system according to the first embodiment of the present invention. The disk box 2 comprises a panel 17. The handle 11 for pulling out the disk box 2 is connected to the disk box panel via a pivot 19. At one vertical side edge (right side in FIG. 4) of the panel 17, there is a groove 18 for accommodating a protrusion 24 of the handle 11, as well as for being the passage of the pushing mechanism (described later). The pushing mechanism 16 is controlled by a control circuit. The control circuit can be designed such that while a failure of a disk drive in the disk box 2 is detected, or the disk drive needs to be replaced, the control circuit controls and drives the pushing mechanism 16 by using a solenoid valve or an electric motor. The pushing mechanism 16 thus passes through the side groove 18 of the panel 17 to push the handle 11. The handle 11 can rotate to an eject state for a user to pull out the disk box 2.

In the system shown in FIG. 4, the handle 11 is connected to the disk box 2 via a pivot 19. The pivot 19 is located at the lower part of the disk box panel 17. The handle 11 includes a handle protrusion 24 located at a position corresponding to the groove 18 on the vertical side of the panel, for the pushing mechanism 16 to push the handle 11. After the handle protrusion 24 is pushed by the pushing mechanism 16, the handle 11 can rotate along the pivot 19 to become an inoperative state, for subsequently to be pulled to withdraw the disk box 2.

On a housing panel 12 of the dual-disk array system 20, there can be a status indicator 13 (e.g., an LED) for indicating an error message (e.g., a blinking LED). Together with the inoperative state shown by the handle 11, the indicator 13 reminds a user to unplug the disk box. The status indicator can also be controlled by the above control circuit. Moreover, for efficient heat dissipation of the disk drive in the disk box 2, the disk box 2 can have some heat dissipation slits 23 on the disk box panel 17. In a preferred embodiment, in designing the layout of the disk box panel 17, heat dissipation slits are a plurality of strip-shaped slits on the protrusion portion 22 of the panel 17. The flat portion on the panel 17 surrounding the protrusion portion 22 can be used to rest the handle 11, while the handle 11 is in an operative state (not in an inoperative state). FIG. 2 clearly illustrates the above situation. Because the disk box 1 is in an operative state, the handle of the disk box 1 is rested on the flat portion surrounding the protrusion portion of the panel of the disk box 1. In contrast, the handle 11 of the disk box 2 is in an inoperative state. The heat dissipation slits 23 are designed to be in strip shape.

In case the control circuit or the pushing mechanism fails and then the disk box handle will not be ejected, in the embodiment shown in FIGS. 3 and 4, a hook 21 is used in the disk array system for a user to manually pull out the disk box.

Figure 5:
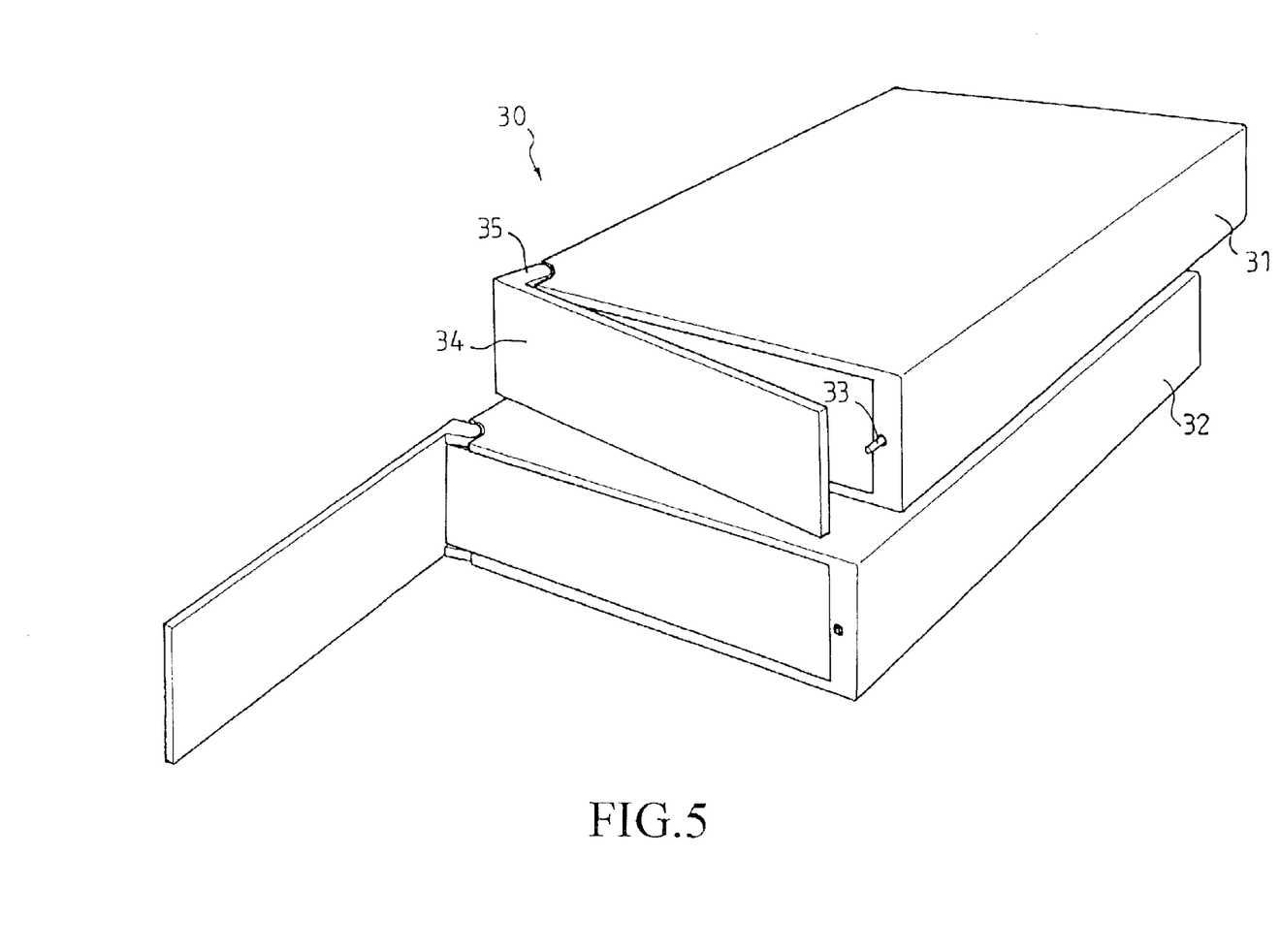
FIG. 5 is a perspective view of two disk boxes in accordance with another embodiment of the present invention, wherein pushing mechanisms are used to push rotatable panels of the disk boxes.

FIG. 5 illustrates a disk array system in accordance with a second embodiment of the present invention. The disk array system 30 comprises disk boxes 31 and 32. Each of the disk boxes 31 and 32 comprises a rotatable panel 34. The panel 34 is connected to the disk box via a side pivot 35. It is clearly shown in FIG. 5 that the pushing mechanism 33 is used to push the rotatable panel 34 of the disk box. In a preferred embodiment, a solenoid valve or an electric motor can be used to release a latch of the panel 34 and push the panel 34 to rotate along the pivot 35, for a user to pull (or push) the panel 34 to withdraw (or restore) the disk box 31.

Figure 6:
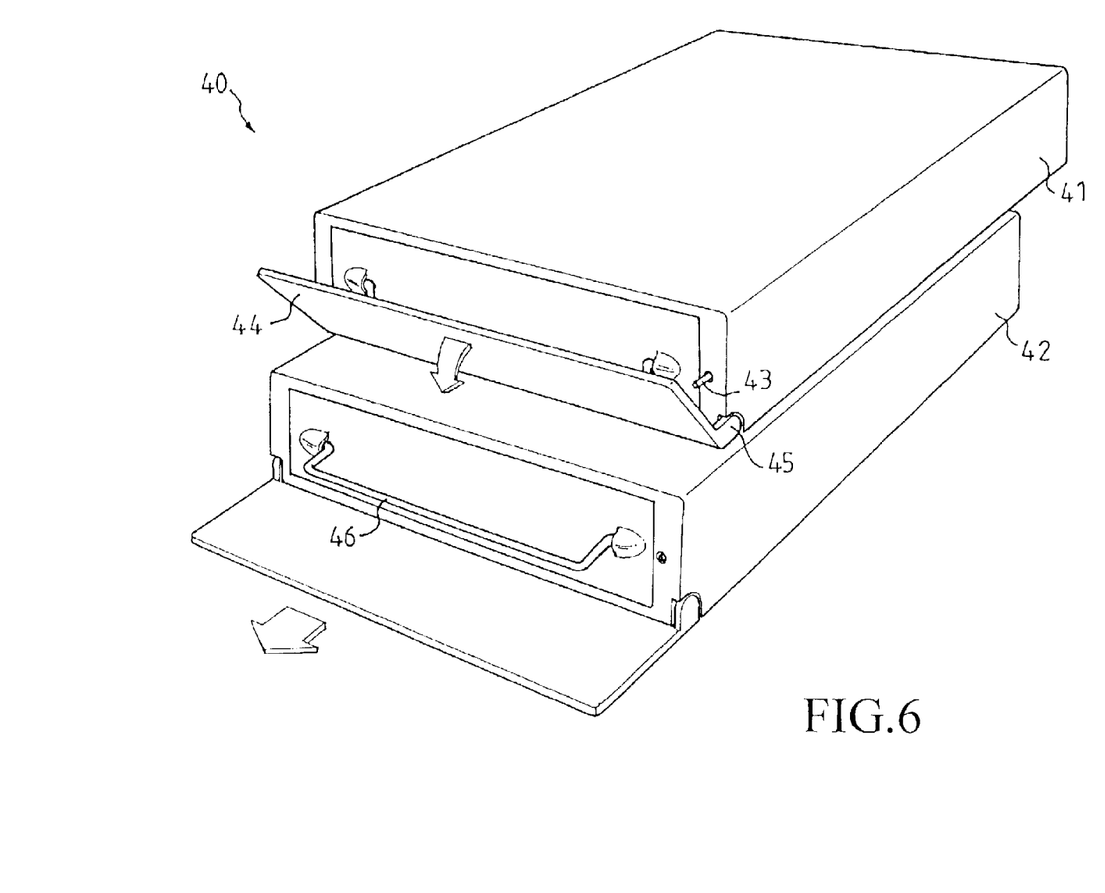
FIG. 6 is a perspective view of two disk boxes in accordance with still another embodiment of the present invention, wherein each disk box further comprises a handle for pulling or pushing a disk box.

FIG. 6 illustrates a disk array system in accordance with a third embodiment of the present invention, in which the disk array system 40 includes disk boxes 41 and 42. Each disk box 41 or 42 has a rotatable panel 44, and the panel 44 is connected to the disk box via a pivot 45 located at the lower part of the front surface of the disk box. In the embodiment disclosed in FIG. 6, a pushing mechanism is used to push the rotatable panel 44. After the panel 44 rotates along the pivot 45 to an inoperative state, a user can pull (or push) a handle 46 on the disk box 42 to withdraw (or inserst) the disk box 41.

Furthermore, because the pushing mechanisms 33 and 43 shown in FIGS. 5 and 6 are located at the front surfaces of housings of the disk array systems 30 and 40, the pushing mechanisms will not move along with the movement of each disk box 31, 32, 41 or 42. However, it should be noted that pushing mechanisms 33 or 43 can be located at the front surfaces of the disk boxes 31, 32, 41 and 42. Under this circumstance, the pushing mechanisms 33 and 43 will move along with the movement of each disk box 31, 32, 41 or 42.

Therefore, the automated disk-ejection apparatus of the present invention can automatically release the handle of panel for a user to withdraw the disk box, while the disk box needs to be withdrawn for loading or replacing the disk drive. The featured disk system has the advantage of easy operation. By using the status indicator, the user can easily locate a target disk drive to be replaced. Thus, it is avoidable for the user to inadvertently unplug a good disk box. Moreover, because the handles of normal disk drives will not be in an inoperative state (that is, the handles of normal disk drives are not ejected), it is impossible for a user to unplug the normal disk drives. The present invention provides a convenient and safe automated disk-ejection. In accordance with the present invention, common end users without the skill of engineering are also able to load or replacing disk drives.

It should be noted that although dual-box disk array systems are illustrated and explained in the present invention, they are not used to limit the present invention. In other words, disk array systems of the present invention can comprise more than two disk boxes. From the invention thus described, it will be obvious that the embodiments and description are not indeed to limit the present invention. The present invention may be varied in many ways. Such variations are not to be regarded as a departure from the spirit and scope of the present invention, and all such modifications as would be obvious to one skilled in the art are intended for inclusion within the scope of the following claims.

What is claimed is:

1. An automated disk-ejection apparatus for use in a disk system, the disk system including at least a disk box for housing at least a disk drive, the apparatus comprising:
    at least a handle for pulling or pushing the at least disk box;
    at least a pushing mechanism for pushing the at least handle; and
    at least a control circuit for controlling the at least pushing mechanism such that while the at least disk box needs to be withdrawn for loading or replacing the at least disk drive, the at least pushing mechanism is activated.

2. The automated disk-ejection apparatus of claim 1, wherein the at least disk box includes a panel having a groove on one of its vertical sides, for the pushing mechanism to move through the vertical side to push the handle.

3. The automated disk-ejection apparatus of claim 1, wherein the handle is connected to the disk box via a pivot.

4. The automated disk-ejection apparatus of claim 3, wherein the handle includes a handle protrusion located at a position corresponding to the groove on the vertical side of the panel, for the pushing mechanism to push the handle, such that the handle can rotate along the pivot to an inoperative state, for subsequently to be pulled for withdrawing the disk box.

5. The automated disk-ejection apparatus of claim 2, wherein the pivot is located at the lower part of the disk box panel.

6. The automated disk-ejection apparatus of claim 2, wherein the disk box panel further comprises heat dissipation slits.

7. The automated disk-ejection apparatus of claim 1, wherein the pushing mechanism further comprises a solenoid valve.

8. The automated disk-ejection apparatus of claim 1, wherein the pushing mechanism further comprises an electric motor.

9. The automated disk-ejection apparatus of claim 1, further comprising a status indicator for indicating operation status.

10. A disk array system having auto-ejection handles, comprising: a plurality of disk boxes for accommodating disk drives, each disk box including a handle for pulling or pushing the disk box; a plurality of pushing mechanisms for pushing the handles or panels of the disk boxes; and a control circuit for controlling the pushing mechanisms such that while at least one of the disk boxes needs to be withdrawn for loading or replacing one of the disk drives, a corresponding pushing mechanism is activated.

11. The disk array system of claim 10, wherein each of the disk boxes includes a panel having a groove on one of its vertical sides, for each pushing mechanism to move through the vertical side of each panel to push the handle.

12. The disk array system of claim 10, wherein each handle is connected to each corresponding disk box by a pivot.

13. The disk array system of claim 11, wherein each handle includes a handle protrusion located at a position corresponding to the groove on the vertical side of the panel, for the pushing mechanism to push the handle, such that the handle can rotate along the pivot to an eject state, for subsequently to be pulled for withdrawing the corresponding disk box.

14. The disk array system of claim 12, wherein each pivot is located at the lower part of each disk box panel.

15. The disk array system of claim 11, wherein each disk box panel further comprises heat dissipation slits.

16. The disk array system of claim 10, wherein each pushing mechanism further comprises a solenoid valve or an electric motor.

17. The disk array system of claim 10, further comprising a plurality of status indicators for indicating operation status of each disk box.

18. The disk array system of claim 10, further comprising a plurality of lock slivers, and a plurality of lock slits located on each of the disk box, wherein each lock sliver can be snapped into the corresponding lock slit to lock each disk box.

19. The disk array system of claim 10, further comprising a hook for withdrawing the disk boxes.

* * * * *